(12) United States Patent
Lundberg

(10) Patent No.: US 9,332,279 B2
(45) Date of Patent: May 3, 2016

(54) METHOD AND DIGITAL VIDEO ENCODER SYSTEM FOR ENCODING DIGITAL VIDEO DATA

(75) Inventor: Stefan Lundberg, Lund (SE)

(73) Assignee: AXIS AB, Lund (SE)

(*) Notice: Subject to any disclaimer, the term of this patent is extended or adjusted under 35 U.S.C. 154(b) by 571 days.

(21) Appl. No.: 13/492,461

(22) Filed: Jun. 8, 2012

(65) Prior Publication Data

US 2012/0320979 A1  Dec. 20, 2012

Related U.S. Application Data

(60) Provisional application No. 61/498,813, filed on Jun. 20, 2011.

(30) Foreign Application Priority Data

Jun. 16, 2011  (EP) ..................................... 11170154

(51) Int. Cl.
| | |
|---|---|
| *H04N 7/32* | (2006.01) |
| *H04N 19/86* | (2014.01) |
| *H04N 19/105* | (2014.01) |
| *H04N 19/176* | (2014.01) |
| *H04N 19/61* | (2014.01) |

(Continued)

(52) U.S. Cl.
CPC .............. *H04N 19/86* (2014.11); *H04N 19/105* (2014.11); *H04N 19/107* (2014.11); *H04N 19/124* (2014.11); *H04N 19/137* (2014.11); *H04N 19/176* (2014.11); *H04N 19/593* (2014.11); *H04N 19/61* (2014.11)

(58) Field of Classification Search
USPC ......................................................... 375/240
See application file for complete search history.

(56) References Cited

U.S. PATENT DOCUMENTS 5,231,492 A * 7/1993 Dangi et al. ................ 348/14.12
5,821,986 A * 10/1998 Yuan et al. .................. 348/14.12

(Continued)

FOREIGN PATENT DOCUMENTS

CN    101742314 A    6/2010
EP      0933948 A2   8/1999

(Continued)

OTHER PUBLICATIONS

Hua Yang et al. "Effective Flicker removal from periodic intra frames and accurate flicker measurement" Image Processing, 2008, ICIP 2008, 15th IEEE International Conference, Piscataway, NJ, USA Oct. 12, 2008, pp. 2868-2871, XP031374640.

(Continued)

*Primary Examiner* — Tracy Li
*Assistant Examiner* — Mohammad J Rahman
(74) *Attorney, Agent, or Firm* — Volpe and Koenig, P.C.

(57) ABSTRACT

A method is used for encoding digital video data corresponding to a sequence of original input video frames. The method comprises: encoding a first original input video frame into an INTER-frame; decoding and reconstructing said INTER-frame into a reference frame; creating an INTRA input frame comprising information from both a second original input video frame and said reference frame; and encoding said INTRA input frame into an INTRA-frame. A digital video encoder system is used for encoding digital video data corresponding to a sequence of original input video frames by encoding the sequence of original input video frames using INTRA- and INTER-mode.

7 Claims, 3 Drawing Sheets

(51) Int. Cl.
*H04N 19/593* (2014.01)
*H04N 19/107* (2014.01)
*H04N 19/124* (2014.01)
*H04N 19/137* (2014.01)

(56) References Cited

U.S. PATENT DOCUMENTS

| | | | |
|---|---|---|---|
| 5,898,461 A * | 4/1999 | Ohsawa et al. | 375/240.12 |
| 7,697,783 B2 | 4/2010 | Lee et al. | |
| 2004/0031052 A1 * | 2/2004 | Wannamaker et al. | 725/61 |
| 2006/0146780 A1 * | 7/2006 | Paves | 370/348 |
| 2006/0222078 A1 * | 10/2006 | Raveendran | H04N 21/2365 375/240.16 |
| 2007/0036213 A1 | 2/2007 | Matsumura | |
| 2007/0064901 A1 * | 3/2007 | Baird et al. | 379/202.01 |
| 2007/0074266 A1 * | 3/2007 | Raveendran | H04N 5/144 725/135 |
| 2007/0081591 A1 | 4/2007 | Ahn | |
| 2007/0230574 A1 | 10/2007 | Valente | |
| 2008/0025397 A1 | 1/2008 | Zhao et al. | |
| 2009/0046092 A1 * | 2/2009 | Sato | H04N 19/46 345/418 |
| 2009/0067489 A1 * | 3/2009 | Jacobs | 375/240.01 |
| 2009/0110054 A1 * | 4/2009 | Kim | H04N 19/647 375/240.1 |
| 2009/0180670 A1 * | 7/2009 | Iwamura | G06T 7/2006 382/107 |
| 2010/0118939 A1 * | 5/2010 | Shimizu | H04N 19/000569 375/240.12 |
| 2010/0238354 A1 * | 9/2010 | Shmueli | G06T 5/002 348/607 |
| 2010/0278432 A1 * | 11/2010 | Pandel | H04N 19/159 382/190 |
| 2011/0052084 A1 * | 3/2011 | Yang | G06T 7/0002 382/221 |

FOREIGN PATENT DOCUMENTS

| | | |
|---|---|---|
| EP | 2172903 A1 | 4/2010 |
| JP | 2007049629 A | 2/2007 |
| JP | 2009-503999 A | 1/2009 |
| JP | 2009147751 A | 7/2009 |

OTHER PUBLICATIONS

Jie Jiang et al. "Efficient Intra Refresh Using Motion Affected Region Tracking for Surveillance Video over Error Prone Networks" Intelligent Systems Design and Applications, 2008, ISDA '08. Eighth International Conference on, IEEE, Piscataway, NJ, USA Nov. 26, 2008, pp. 242-246, XP031368498.

Japanese Office Action with an English Translation for Japanese Patent Application No. 2012-127963 dated Jun. 25, 2013, 4 pgs.

* cited by examiner

METHOD AND DIGITAL VIDEO ENCODER SYSTEM FOR ENCODING DIGITAL VIDEO DATA

FIELD OF THE INVENTION

The present invention relates to a method and a digital video encoder system for encoding digital video data corresponding to a sequence of original input video frames by encoding the sequence of original input video frames using INTRA- and INTER-mode.

BACKGROUND OF THE INVENTION

In modern digital video coding systems, two main modes are used to compress video signals: the INTRA mode and the INTER mode. In the INTRA mode, the luminance and chrominance channels are encoded by exploiting the spatial redundancy of the pixels in a given channel of a single image via transform coding. The INTER mode, exploiting the temporal redundancy between separate frames, relies on a motion-compensation technique that predicts a frame from one or more previously decoded frame(s) by encoding the motion of pixels from one frame to the other. In INTER mode the luminance and chrominance channels share the same motion description.

Usually a frame to be encoded is partitioned into independent blocks (macro block or pixel block) being compressed and encoded individually. In INTER mode each of the blocks are assigned one or several motion vectors and a prediction of the frame is constructed by displacing pixel blocks from past and/or future frame(s) according to the set of motion vectors. Finally, the difference between the frame to be encoded and its motion-compensated prediction, called the residual signal, is encoded in a similar way to the INTRA-mode by transform coding.

In MPEG terminology the INTRA mode corresponds to I frames, while the INTER mode corresponds to P and B frames. The coding efficiency of the INTER mode is much higher than the one of the INTRA mode, because it takes advantage of temporal prediction: much of the signal is contained in the prediction formed by motion compensation, and the residual signal has a smaller energy than the original signal. Because their encoding relies only on their own spatial redundancy, INTRA frames can be decoded independently from any other pictures, which is not the case for INTER frames, and are therefore inserted periodically in a bit stream. An INTRA-frame may be either a scene change frame, placed at the beginning of a new group of frames corresponding to a scene change where no temporal redundancy is available, or a refresh frame, placed in other locations where some temporal redundancy is available.

INTRA and INTER frames exhibit different coding artifacts, since the underlying encoding method is different. Throughout a homogeneous video sequence, the quality and artifacts of subsequent INTER frames tend to stabilize. However, if an INTRA refresh frame is encoded, all preceding artifacts, due to INTER coding, are erased, and new ones, due to INTRA coding, are introduced abruptly. Video quality is therefore disruptive at INTRA refresh frames, resulting in what is here called a flashing effect, also flickering and pumping effect are used in the literature. The flashing effect is especially visible in low motion sequences and at moderate or low bitrates, when coding artifacts become quite noticeable.

Various methods and devices for reducing this flashing effect exist. Some examples are disclosed in the following references: US2000710230574, US2007/0081591 and US2008/0025397.

The draw back with earlier methods is the added amount of calculations needed in terms of extra compression rounds. The present invention is directed towards an alternative method and device for reducing the flashing effect without adding extra rounds of compression.

SUMMARY OF THE INVENTION

In view of the above, an objective of the invention is to solve or at least reduce one or several of the drawbacks discussed above. Generally, the above objective is achieved by the attached independent claims.

In particular, according to a first aspect of the invention, a method for encoding digital video data corresponding to a sequence of original input video frames is presented. The method comprises encoding a first original input video frame into an INTER-frame; decoding and reconstructing said INTER-frame into a reference frame; creating an INTRA input frame comprising information from both a second original input video frame and said reference frame; and encoding said INTRA input frame into an INTRA-frame.

This method is advantageous in that it facilitates reducing of said flashing effect without adding extra rounds of compression. One reason for this advantageous result is that information both from a previously encoded INTER-frame as well as from an original input frame are used to create an input frame to be encoded into an INTRA-frame and hence any coding artifacts present in the previously encoded INTER-frame will at least partly be present in the newly encoded INTRA frame and hence said flashing effect will be reduced. Moreover, the present method does not alter or change the video coding standards of the ISO/MPEG family (MPEG-1, MPEG-2, MPEG-4) and to the video recommendations of the ITU-H.26X family (H.261, H.263 and extensions, H.264).

The method may further comprise dividing said second original input frame into sub areas; and for each sub area of said second original input frame, determining a level of motion in the sub area of said second original input video frame.

The ratio of information from said second original input frame and said reference frame used for creating a sub area of said INTRA input frame corresponding to a sub area of said second original input frame may be based on the level of motion identified in the corresponding sub area of said second original input frame. By doing this information for areas of the INTRA input frame with high level of motion may be fetched from the original input frame whereas information for areas of the INTRA input frame with low level of motion may be fetched from the reference frame.

A first sub area of said INTRA input frame may be created using information exclusively from said second original input video frame.

A second sub area of said INTRA input frame may be created using information exclusively from said reference frame.

A third sub area of said INTRA input frame may be created using information from both said second original input video frame and said reference frame.

The method may further comprise encoding an area of said INTRA input frame mainly based on information from said second original input video frame at a first quantization value and encoding an area of said INTRA input frame mainly based on information from said reference frame at a second quantization value, wherein said second quantization value is different to said first quantization value. Hence, the areas with high level of motion may be encoded using higher quality than areas where low or no level of motion.

Said INTER-frame may be a P-frame or a B-frame and said INTRA frame may be an I-frame.

According to another aspect of the invention a computer-readable recording medium having recorded thereon a program for implementing the method above when executed on a device having processing capabilities is presented. In another aspect, the computer-readable recording medium is a non-transitory computer-readable recording medium.

According to yet another aspect of the invention a digital network camera arranged to execute the program recorded on the computer-readable recording medium is presented.

According to a further aspect of the invention a digital video encoder system for encoding digital video data corresponding to a sequence of original input video frames by encoding the sequence of original input video frames using INTRA- and INTER-mode is presented. The digital video encoder system comprises: an encoder module being arranged to process input frames into an INTRA-frame or an INTER-frame; a decoder module being arranged to decode the INTRA- or the INTER-frame encoded by the encoder; a motion compensation module being arranged to use the information from the decoder module in order to reconstruct the encoded frame into a reference frame; and an INTRA input frame construction module being arranged to create an INTRA input frame using information from an original input video frame as well as information from a previously encoded and reconstructed reference frame, wherein the encoder module when encoding an INTRA-frame is arranged to use the INTRA input frame being constructed by means of the INTRA input frame construction module.

The digital video encoder system may further comprise a motion detection module being arranged to detect a level of motion in sub areas of said original input video frame, wherein said INTRA input frame construction module is arranged to decide the ratio of information from said original input frame and said reference frame to be used to create a sub area of said INTRA input frame corresponding to a sub area of said original input frame based on the level of motion identified in the corresponding sub area of said original input frame by means of the motion detection module.

The digital video encoder system may be implemented in a surveillance camera.

BRIEF DESCRIPTION OF THE DRAWINGS

This and other aspects of the present invention will now be described in more detail, with reference to appended drawings showing embodiments of the invention. The figures should not be considered limiting the invention to the specific embodiment; instead they are used for explaining and understanding the invention. Like numbers refer to like elements throughout the figures.

DETAILED DESCRIPTION

The present invention relates to a digital video encoder system and method for encoding digital video data corresponding to an original sequence of frames.

In the following description, for purposes of explanation, specific nomenclature is set forth to provide a thorough understanding of the present invention. However, it will be apparent to one skilled in the art that these specific details are not required in order to practice the present invention. For example, the present invention has been described with reference to the video coding standards of the ISO/MPEG family (MPEG-1, MPEG-2, MPEG-4) and to the video recommendations of the ITU-H.26X family (H.261, H.263 and extensions, H.264). However, the same techniques can easily be applied to other types of video coding standards.

In modern digital video coding systems, two main modes are used to compress a video frame of a video stream of video frames: the INTRA-mode and the INTER-mode. In the INTRA-mode, the luminance and chrominance channels are encoded by exploiting the spatial redundancy of the pixels in a given channel of a single frame via transform coding. The INTER-mode, exploiting the temporal redundancy between separate frames, relies on a motion-compensation technique that predicts a frame from one (or more) previously decoded frame(s) by encoding the motion of pixels from one frame to the other. In INTER mode the luminance and chrominance channels share the same motion description.

Usually, a frame to be encoded is partitioned into independent blocks (macro block or pixel block) being compressed and encoded individually. In INTER mode each of the blocks are assigned one or several motion vectors. A prediction of the frame is constructed by displacing pixel blocks from past and/or future frame(s) according to the set of motion vectors. Finally, the difference, called the residual signal, between the frame to be encoded and its motion-compensated prediction is encoded in a similar way to the INTRA-mode by transform coding.

Video frames being encoded according to the INTRA-mode, without any reference to any past or future frame, are called I-frames. Video frames being encoded according to the INTER-mode are themselves either mono-directionally predicted frames, called P-frames and encoded with reference to a past or future frame which is an INTRA- or INTER-frame, or bi-directionally predicted frames, called B-frame and encoded with reference to two or more past or future reference frames.

INTRA-frames comprises either scene change frames, placed at the beginning of a new group of frames corresponding to a scene change, where no temporal redundancy is available, or refresh frames, placed in other locations where some temporal redundancy is available.

Figure 1:
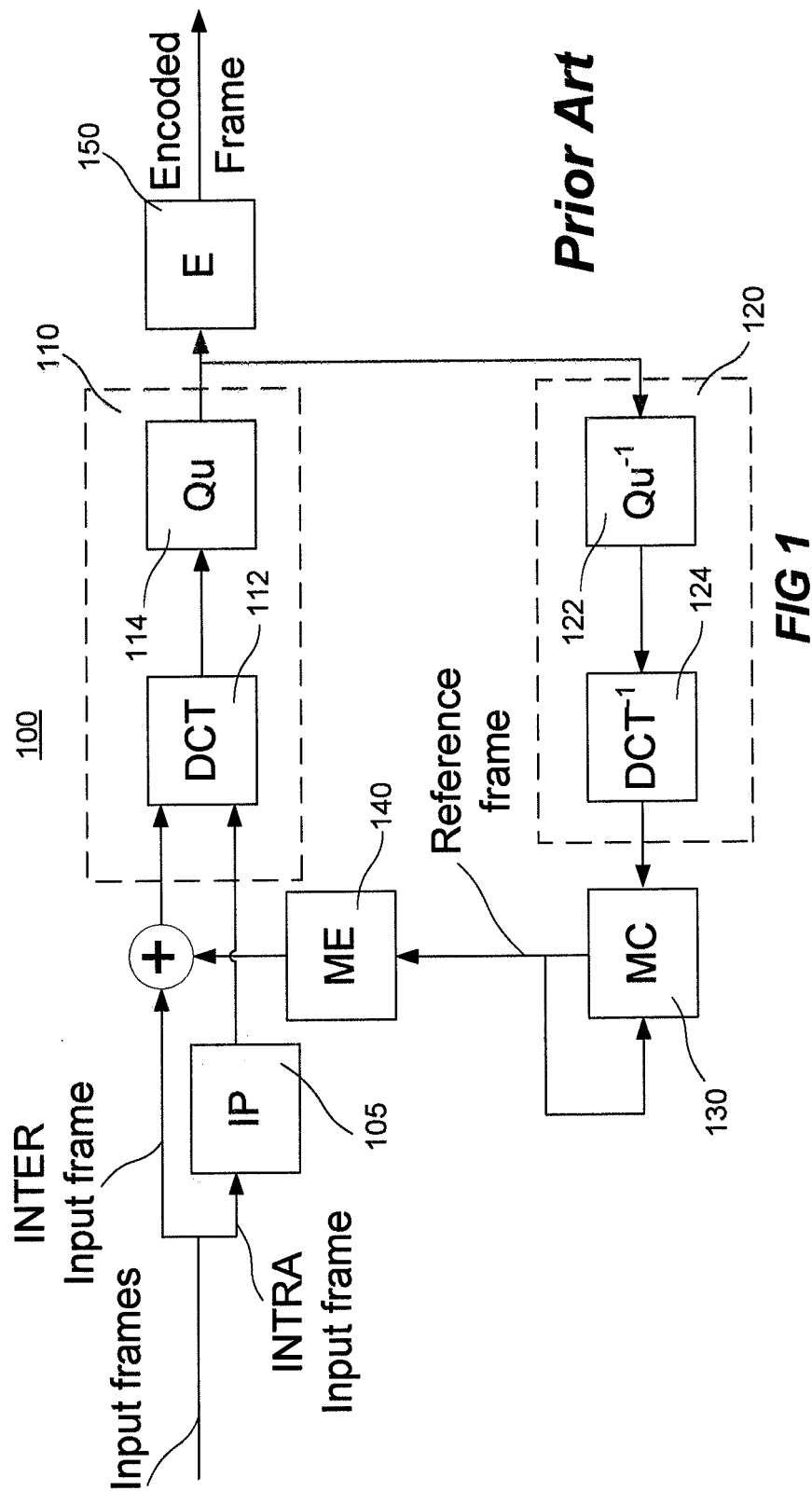
FIG. 1 illustrates a high-level block diagram of a digital video encoder system according to prior art.

FIG. 1 illustrates a high-level block diagram of a typical digital video encoding device 100 as is well known in the art. The digital video encoding device 100 receives an input video stream of video frames. Each video frame is processed by a discrete cosine transformation (DCT) module 112. As mentioned above each frame may be processed independently (an INTRA-frame) or with reference to information from other frames received from a motion estimation module 140 (an INTER-frame). Next, a quantizer (Qu) module 114 quantizes the information from the discrete cosine transformation module 112. The discrete cosine transformation module 112 and the quantizer module 114 constitute an encoder module 110. Finally, the quantized video frame is then encoded with an entropy encoder (E) module 150 to produce an encoded bit stream. The entropy encoder (E) module 150 may for instance use a variable length coding (VLC) system or arithmetical coding (CABAC).

Since an INTER-frame encoded video frame is defined with reference to other nearby video frames, the digital video encoder 100 needs to create a copy of how each decoded frame, with unavoidable coding artifacts, will appear after the decoding process of the digital video decoder so that INTER-frames may be correctly encoded. Thus, the lower portion of the digital video encoder 100 is actually a digital video decoder module 120. Specifically, an inverse quantizer ($Qu^{-1}$) module 122 reverses the quantization of the video frame information and an inverse discrete cosine transformation ($DCT^{-1}$) module 124 reverses the discrete cosine transformation of the video frame information. After the DCT coefficients have been reconstructed from the $DCT^{-1}$ module 124, a motion compensation module 130 will use the information, along with the motion vectors, to reconstruct the encoded frame which is then used as the reference frame for the motion estimation of the next frame.

The decoded video frame may then be used to encode INTER-frames (P-frames or B-frames) that are defined relative to information in the decoded video frame. Specifically, a motion compensation (MC) module 130 and a motion estimation (ME) module 140 are used to determine motion vectors and generate differential values used to encode INTER-frames. The motion estimation (ME) module 140 generally include memory means for storing a copy of the last decoded image which is used when generating the needed differential values.

Using H.264 (MPEG-4 Part 10) methods of predicting INTRA coded macroblocks is facilitated. If a block or macroblock is encoded in intra mode, a prediction block is formed based on previously encoded and reconstructed blocks within the same image. This prediction block is subtracted from the current block prior to encoding. Thus, an INTRA prediction module is an essential part of H.264 codec, since it reduces the amount of data to be encoded by predicting pixel values (luminance and chrominance) from their neighboring blocks. In FIG. 1 the INTRA prediction method is implemented by means of the INTRA prediction (IP) module 105.

INTRA and INTER frames exhibit different coding artifacts, since the underlying encoding method is different. Throughout an homogeneous video sequence, the quality and artifacts of subsequent INTER frames tend to stabilize. However, if an INTRA refresh frame is encoded, all preceding artifacts, due to INTER coding, are erased, and new ones, due to INTRA coding, are introduced abruptly. Video quality is therefore disruptive at INTRA refresh frames, resulting in what is here called a flashing effect, also flickering and pumping effect are used in the literature. The flashing effect is especially visible in low motion sequences and at moderate or low bitrates when coding artifacts become quite noticeable.

Thus, a problem to solve is to reduce the flashing effect due to the different coding artifacts when coding INTRA and INTER frames. Various methods and devices for reducing the flashing effect exist. Some examples are disclosed in the following references: US20007/0230574, US2007/0081591 and US2008/0025397. The present invention is directed towards an alternative method and device for reducing the flashing effect. In summary the present invention is based on the following:

The first INTRA frame in a sequence of video frames (where no prior INTER frames are available) is coded according to normal methods, see discussion above. For the first INTRA frame no flashing effect will be visible.
Upcoming INTRA frames introduced as refresh frames are coded according to the following:
Sub areas of the current original input frame comprising motion are identified. As a non-limiting example, this may e.g. be made by comparing the current input frame with one or more previous (or possible future) original input frame(s). Alternatively, as a yet nonlimiting example, this may be made by comparing the current original input frame with a background model of the current state of the scene.
For each sub area comprising motion the level of motion is determined.
A new input frame, called an INTRA input frame is created to replace the original input frame. The data content of the INTRA input frame is a mixture of data from the current original input frame and data from a reference frame (being reconstructed from a previously encoded frame), where normally data from the last reference frame is used. The INTRA input frame data for sub areas with high level motion are mainly fetched from the original input frame, whereas data for sub areas with no motion or low level motion are mainly fetched from the reference frame. The ratio of information being fetched from the original input frame and being fetched from the reference frame in a specific sub area is based on the determined level of motion for the specific sub area.
The INTRA input frame comprising information/data from both the original input frame and the reference frame is encoded into an INTRA-frame.
Optionally the INTRA input frame is coded with different quality for areas with high level of motion as compared with for areas with no or low level of motion.
Optional any in-loop deblocking filter (possibly present if H.264 is used) may be disabled for this particular INTRA frame.

Figure 2:
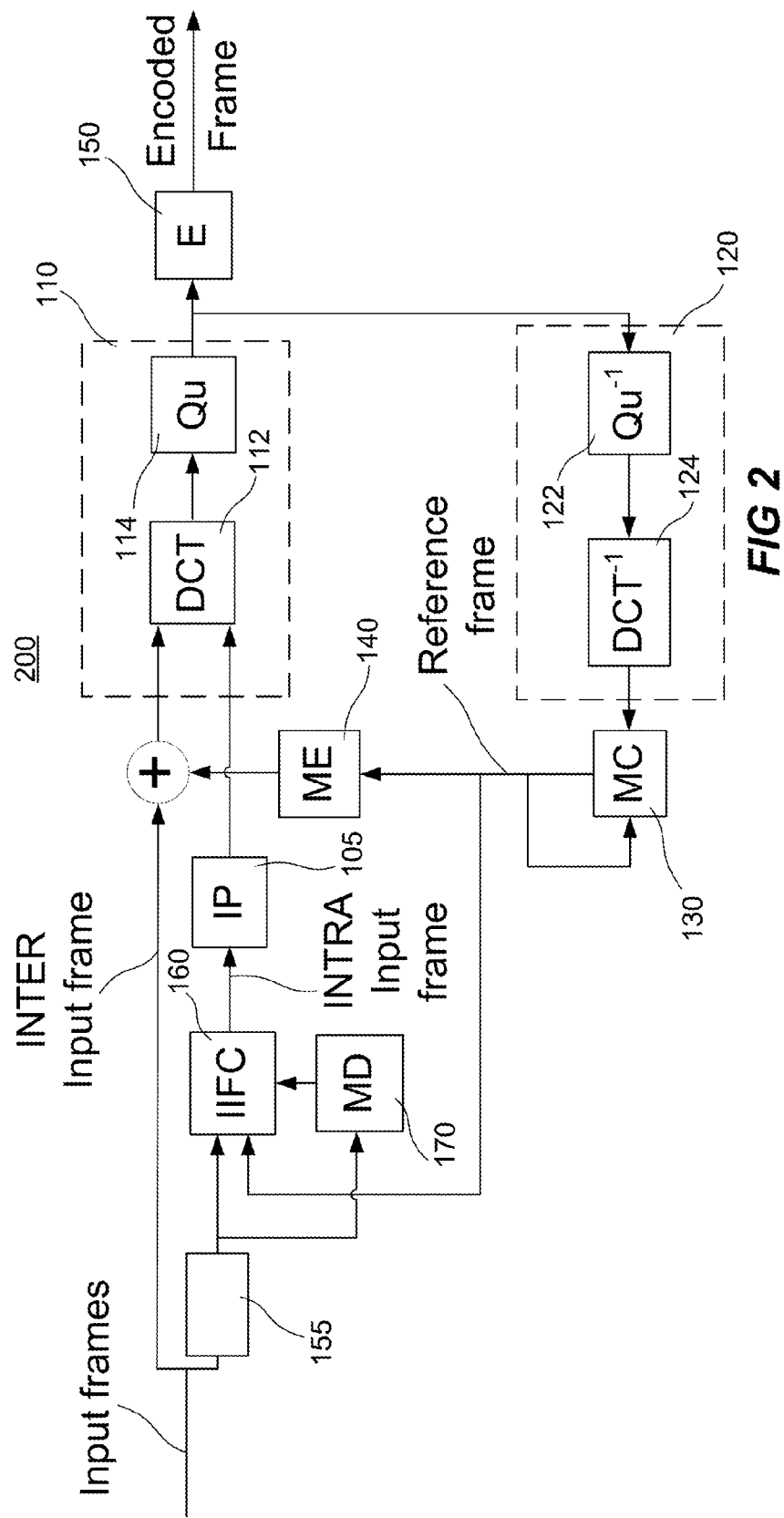
FIG. 2 illustrates a high-level block diagram of an embodiment of a digital video encoder system according to the present invention.

FIG. 2 illustrates a high-level block diagram of an embodiment of a digital video encoder system 200 according to the present invention. The digital video encoder system 200 is arranged for encoding digital video data corresponding to a sequence of original input video frames. More precisely, the digital video encoder system 200 is arranged to encode the sequence of original input video frames using INTRA- and INTER-mode.

The digital video encoder system 200 comprises an INTRA prediction (IP) module 105, an encoder module 110, a decoder module 120, a motion compensation module 130, a motion estimation (ME) module 140 and an entropy encoder (E) module 150, all these modules are also present in the prior art encoder system as illustrated in FIG. 1. In addition an INTRA input frame construction (IIFC) module 160 and a motion detection (MD) module 170 have now been added at the input of the encoder system. Hence, the INTRA input frame construction (IIFC) module 160 and the motion detection (MD) module 170 form a pre-coding-process stage of the digital video encoder system 200 according to the present invention.

According to an embodiment of the present invention the digital video encoder system 200 is implemented in a surveillance camera.

The INTRA prediction (IP) module 105 is arranged to, in INTRA-mode, reduce the amount of data to be encoded by predicting pixel values (luminance and chrominance) from their neighboring blocks.

The encoder module 110 comprises a discrete cosine transformation (DCT) module 112 and a quantizer (Qu) module 114. The DCT module 112 is arranged to transform the input data, in the form of INTRA or INTER input frames, using a discrete cosine transformation. The quantizer module 114 is arranged to quantize the information from the DCT module 112. When the digital video encoder system 200 is in INTRA-mode the encoder module 110 is being arranged to process INTRA input frames into INTRA-frames. When the digital video encoder system 200 is in INTER-mode the encoder module 110 is being arranged to process INTER input frames into INTER-frames.

The entropy encoder module 150 is arranged to produce an encoded bit stream by encoding the quantized video frames outputted from the encoder module 110. The entropy encoder (E) module 150 may for instance use a variable length coding (VLC) system or arithmetical coding (CABAC).

As mentioned above, since an INTER-frame encoded video frame is defined with reference to other nearby video frames, the digital video encoder 200 needs to create a copy of how each decoded frame, with unavoidable coding artifacts, will appear after the decoding process of the digital video decoder so that INTER-frames may be correctly encoded. Consequently, the decoder module 120 is arranged to decode the INTRA- or the INTER-frames encoded by the encoder module 110. The decoder module 120 comprises an inverse quantizer ($Qu^{-1}$) module 122 and an inverse discrete cosine transformation ($DCT^{-1}$) module 124. The quantizer ($Qu^{-1}$) module 122 is arranged to reverse the quantization of the video frame information from the encoder module 110. The inverse discrete cosine transformation ($DCT^{-1}$) module 124 is arranged to reverse the discrete cosine transformation of the video frame information from the encoder module 110.

The motion compensation module 130 is arranged to use the information from the decoder module 120 in order to reconstruct the encoded frame into a reference frame. That is, after all the DCT coefficients are reconstructed from the $DCT^{-1}$ module 124, the motion compensation module 130 will use the information, along with the motion vectors, to reconstruct the encoded frame. In INTER-mode the reconstructed frame is used as the reference frame for the motion estimation of the next frame.

The motion estimation (ME) module 140 is used to determine motion vectors and generate differential values used to encode INTER-frames.

So far is the digital video encoder system 200 according to the present invention similar to a conventional digital video encoder system as e.g. illustrated in FIG. 1.

The new features of the digital video encoder system 200 according to the present invention are the INTRA input frame construction module 160 and the motion detection module 170.

The motion detection module 170 is arranged to detect a level of motion in sub areas of an original input video frame. The motion detection module 170 and its function will be discussed in more detail below.

The INTRA input frame construction (IIFC) module 160 is arranged to create an INTRA input frame using information from an original input video frame as well as information from an encoded and reconstructed reference frame. When being in INTRA-mode, the digital video encoder system 200 is arranged to use the INTRA input frame in order to encode an INTRA-frame. Furthermore, the INTRA input frame construction module 160 is arranged to decide the ratio of information from said original input frame and said reference frame to be used to create a sub area of said INTRA input frame corresponding to a sub area of said original input frame, where module 155 divides a second original input video frame into sub areas for processing by the INTRA input frame construction module 160 and the motion detection module 170. This decision is based on the level of motion identified in the corresponding sub area of said original input frame by means of the motion detection module 170. There are number of methods/algorithms for detecting motion in a sequence of video frames. Below some non-limiting examples will be explained.

A simple algorithm for motion detection compares the current original input frame (or the sub area of the current original input frame) with another original input frame (or the sub area of the another original input frame) and simply counts the number of pixels that differ. Alternatively, the algorithm may compare the current original input frame (or the sub area of the current original input frame) with a background model of the current state of the scene (or the sub area of the background model of the current state of the scene). The level of motion in each sub area may then be correlated to the number of pixels that differ.

A more complicated algorithm for motion detection as well as for updating a background model of the current state of the scene as captured by a camera will now be described.

In order to facilitate the understanding of the process one iteration of the iterative background model updating process is described. Hence the process relates to an iteration performed sometime after an initial iteration. Even if there are some differences between an initial iteration, mainly relating to setting initial values, the skilled person may easily implement the initial iteration from the description below. Moreover, the background model update may be performed each and every time a new frame/image is captured or at a regular interval. The process below is therefore describing the situation after capturing a new frame/image and is hence returned to the frame/image capturing process when an iteration of the background model updating process has been performed. The frame/image capturing process is not described herein as it is well known to persons skilled in the art.

At a given moment or background model iteration new frame/image data relating to time has been captured. At this time the memory of the camera includes:

newly captured frame/image data data of a background model generated in the previous iteration, data representing each object identified in the previous iteration. The data representing an object comprises a motion vector, an image representing the object and a bounding box enclosing the image.

data representing a foreground image depicting possible object pixels identified in the previous iteration.

The background model update process is able to access this data.

Then the background model update starts and a motion map is generated. The motion map is generated from the current frame/image data captured and it is indicating the pixels of the frame/image being in motion.

A new position within the image view of each identified object is then predicted using the velocity vector for each object and the time difference between the capturing of the current frame/image data and the capture of the previous frame/image data.

Then the motion map is segmented into fragments that are matched to existing objects by e.g. looking at each object's bounding box and image. This matching is performed by calculating match scores. The match scores are calculated by comparing overlaps and distances between segments and each area defined by an object bounding box and/or between segments and each object image. Then based on the matching result the objects are resolved and compiled into propagation, merges, splits, deletion or creation of objects.

After the segmentation, the objects are updated to cover matched fragments from the motion map. The process is then continued by updating the background model in areas not being an area enclosed by the bounding boxes of the objects. The updating of these areas of the background model is performed either by replacing the corresponding pixel or by adjusting the present pixel based on the present value from the background model and the new value.

The data representing the foreground image from the previous iteration is then cleared and new values are calculated for the regions that include objects by comparing the background model with the captured frame/image. Based on the new foreground image and motion map the objects are then updated with new motion vector, a new image representing the object and a new bounding box enclosing the new image of the object.

When the objects have been updated the background model is fine-tuned by updating pixels positioned within each bounding box. The pixels that are updated are the pixels within the bounding box that are not being part of the indentified object and the update is performed by determining the value of corresponding pixels of the background model either by replacing the corresponding pixel or by adjusting the present pixel based on the present value and the new value. The background model has thus been updated and the process returns to said frame/image capturing process.

To determine motion in this case the difference between the new image and the old image, where in this case the background model is used as the old image, would be computed.

In US2010/0080477 yet another method for video motion detection is described. According to this method a series of images of a video sequence are combined into an image volume having vertices of X, Y and t. The image volume is sliced in either the (X,t) or (Y,t) planes, filtered with a spatio-temporal filter and threshold to reduce the amount of information. Then a search algorithm searches along search lines in a subset of the video sequence to locate motion. Motion can be detected by identifying lines that are not parallel to any of the vertices. Stationary subjects and lighting changes appear as lines parallel to one of the vertices. Thus, true motion can be distinguished from lighting changes. To determine motion in this case the number of pixels that has been detected as moving would be used.

The value for level of motion that may be used in the aim to reduce INTRA refresh frame flickering, may be calculated for the complete image but more often it is a local value for each sub area that the image may be divided into.

One example would be that each sub area of the image, e.g. as small as only 9 pixels, is checked for motion and each individual pixel is marked with 1 for motion or 0 for no motion. These values are added to give a "sub area sum of motion". This leads to that "max motion" within the sub area is 9 (if motion in all pixels) and the "min motion" 0. The "sub area level of motion" will then be calculated as: "sub area sum of motion"/"max motion".

As an alternative of using single pixel based sub-areas, averaging the motion values in blocks of pixels may be used to reduce the level of motion.

Several other methods of creating these sub-areas, their motion value and their level of motion may be envisaged.

In addition the "sub area level of motion" may be optimized based on a calculated interpolation between the "sub area level of motion" from the neighboring sub areas. This interpolation may be linear or non linear and may be aimed to give sharper object boundaries.

Once the level of motion for each sub area is determined the ratio of data/information from the original input frame and the data/information from the reference frame may be established. With this the corresponding sub area of the INTRA input frame may be created. For example: if the level of motion is above a first threshold data/information exclusively from the original input video frame is used for creating the corresponding sub area of the INTRA input frame; if the level of motion is below a second threshold data/information exclusively from the reference frame is used for creating the corresponding sub area of the INTRA input frame; and if the level of motion is below the first threshold and above the second threshold data/information from both the original input frame and the reference frame is used for creating the corresponding sub area of the INTRA input frame. For the last case when data/information from both the original input frame and the reference frame is used for creating the corresponding sub area of the INTRA input frame the ratio of the data/information from the original input frame and the reference frame may be based on the level of motion in the specific sub area.

As mentioned previously, optionally the INTRA input frame may be coded with a different quality for blocks having higher level of motion as compared with blocks with no or low level of motion. Typically blocks with high motion will be coded with a higher quality, i.e. lower quantization value.

However the sub areas on which the above presented "sub area level of motion" value is defined may well be different to the blocks used by the video encoder, both in size and location. If one sub area is marked as having a high level of motion it is not obvious which block in the encoding process that should be coded with a different quality as a consequence.

One solution may be that also a "block level of motion" value is calculated based on the "sub area level of motion". The coding quality for a coding block may be depending of this "block level of motion" e.g. by defining threshold values defining when the quality value should change. Higher coding quality will typically encode motion better and a lower coding quality will create a more even coding quality.

Figure 3:
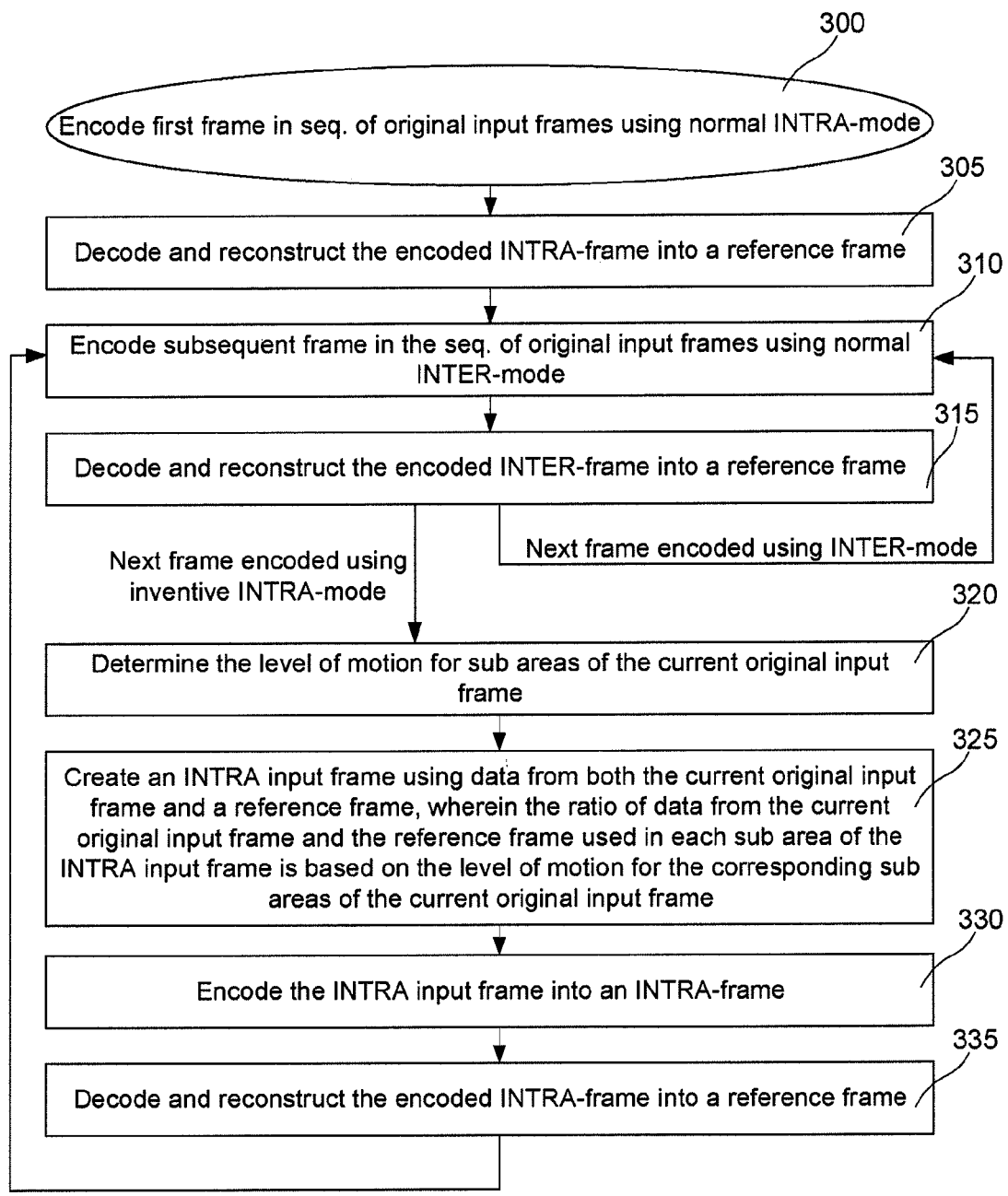
FIG. 3 is a block diagram regarding an embodiment of the method for encoding digital video data.

The present invention also relates to a method for encoding digital video data corresponding to a sequence of original input video frames. With reference to FIG. 3 an embodiment of the inventive method will now be discussed in more detail.

Depending on the mode of encoding, original input frames are encoded using either INTRA or INTER-mode.

The first frame in a sequence of video frames (where no prior INTRA or INTER frames are available) is encoded, step 300, according to regular INTRA-frame encoding methods, i.e. the frame is encoded without any reference to any past or future frames and the luminance and chrominance channels are encoded by exploiting the spatial redundancy of the pixels in a given channel of a single frame via transform coding. For the first INTRA frame no flashing effect will be visible. The first INTRA-frame is decoded and reconstructed into a reference frame, step 305, to be used for producing the following INTER-frame.

Next one or more original input video frames in the sequence of original input frames is/are encoded into INTER-frame(s) using regular (see above) INTER-mode encoding, step 310. Each INTER-frame is decoded and reconstructed into a reference frame, step 315, to be used for producing the following INTER-frame or alternatively as input data when creating an INTRA input frame (step 325).

Upcoming INTRA frames introduced as refresh frames are coded according to the following: Sub areas of the current original input frame is divided into sub areas and for each sub area of the current original input frame the level of motion is determined, 320. A new input frame, called an INTRA input frame is created, step 325, to replace the original input frame. The data content of the INTRA input frame is a mixture of data from the current original input frame and data from a reference frame. This reference frame is reconstructed from a previously decoded frame in step 315, normally being the last reference frame used. For the INTRA input frame data for sub areas with high level motion are mainly fetched from the original input frame whereas data for sub areas with no motion or low level motion are mainly fetched from the reference frame. The ratio of information being fetched from the original input frame and being fetched from the reference frame in a specific sub area is based on the determined level of motion for the specific sub area of the original input frame.

The INTRA input frame comprising information/data from both the original input frame and the reference frame is encoded into an INTRA-frame, step 330. Optionally the INTRA input frame is coded with different quality (higher quality corresponds to lower quantization value, lower quality corresponds to higher quantization value) for areas with high level of motion as compared with for areas with areas no or low level of motion. Thereafter, the encoded INTRA-frame is decoded and reconstructed into a reference frame, step 335, to be used as a reference frame for the next frame to be coded. The next frame to be coded may typically be an INTER-frame (as is the case shown in FIG. 3) an INTRA scene change frame or another INTRA refresh frame.

The person skilled in the art realizes that the present invention by no means is limited to the aspect and embodiments described above.

For example the detection of motion in the sub areas of the original input frames as well as the creation of the level of motion value in the various sub areas of the original input frames may be determined in various ways.

Moreover, the ratio of information/data from an original input frame and a reference frame might be varied due to the determined level of motion as well as due to factors controlled by the user of the method/encoder system.

Furthermore, according to an embodiment of the present invention the INTRA prediction (IP) module 105 does not need to be present in the digital video encoder system.

Moreover, not all refresh frames (INTRA-frames) in a sequence of encoded video frames need to be encoded according to the inventive method.

Thus, many modifications and variations are possible within the scope of the appended claims.

The invention claimed is:

1. A method implemented by an encoder system for encoding digital video data corresponding to a sequence of original input video frames, comprising:
    encoding a first original input video frame into an INTER-frame,
    decoding and reconstructing the INTER-frame into a reference frame,
    dividing a second original input video frame into sub areas,
    for each sub area of said second original input video frame, determining a level of motion in the sub area of said second original input video frame,
    creating an INTRA input frame comprising information from both the second original input video frame and the reference frame, wherein the ratio of information from said second original input video frame and said reference frame used for creating a sub area of said INTRA input frame corresponding to a sub area of said second original input video frame is based on level of motion identified in the corresponding sub area of said second original input video frame,
    wherein:
        if the level of motion in the sub area of said second original input video frame is above a first threshold, information exclusively from the second original input video frame is used for creating the sub area of the INTRA input frame,
        if the level of motion is below a second threshold, information exclusively from the reference frame is used for creating the sub area of the INTRA input frame, and
        if the level of motion is below the first threshold and above the second threshold, information from both the second original input video frame and the reference frame is used for creating the sub area, and
        wherein the second threshold is greater than the first threshold, and encoding the INTRA input frame into an INTRA-frame.

2. The method according to claim 1, further comprising encoding an area of the INTRA input frame mainly based on information from the second original input video frame at a first quantization value and encoding an area of the INTRA input frame mainly based on information from the reference frame at a second quantization value, wherein the second quantization value is different than the first quantization value.

3. The method according to claim 1, wherein the INTER-frame is a P-frame or a B-frame and the INTRA frame is an I-frame.

4. A non-transitory computer-readable recording medium having recorded thereon a program, that when executed, performs the method according to claim 1.

5. A digital network camera comprising the non-transitory computer readable recording medium of claim 4, and a processor arranged to execute the program recorded on the non-transitory computer-readable recording medium.

6. A digital video encoder system for encoding digital video data corresponding to a sequence of original input video frames by encoding the sequence of original input video frames using INTRA- and INTER-mode, comprising:
    an encoder module being arranged to process input frames into an INTRA-frame or an INTER-frame;
    a decoder module being arranged to decode the INTRA- or the INTER-frame encoded by the encoder module;
    a motion compensation module being arranged to use the information from the decoder module in order to reconstruct the encoded frame into a reference frame,
    an INTRA input frame construction module being arranged to create an INTRA input frame using information from an original input video frame as well as information from a previously encoded and reconstructed reference frame, wherein the encoder module when encoding an INTRA-frame is arranged to use the INTRA input frame being constructed by the INTRA input frame construction module, and
    a motion detection module detecting a level of motion in sub areas of said original input video frame,
    the INTRA input frame construction module is arranged to use information from a reference frame being formed by encoding a first original input video frame into an INTER-frame and thereafter reconstructing said INTER-frame into the reference frame and information from a second original input video frame to create the INTRA input frame,
    wherein the INTRA input frame construction module is arranged to decide the ratio of information from said original input video frame and said reference frame used to create a sub area of said INTRA input frame corresponding to a sub area of said original input video frame based on the level of motion identified in the corresponding sub area of said original input video frame by the motion detection made, wherein:
if the level of motion in the sub area of said original input video frame is above a first threshold, information exclusively from the original input frame is used for creating the sub area of the INTRA input frame,
if the level of motion is below a second threshold, information exclusively from the reference frame is used for creating the sub area of the INTRA input frame, and
if the level of motion is below the first threshold and above the second threshold, information from both the original input frame and the reference frame is used for creating the sub area, and
wherein the second threshold is greater than the first threshold.

7. The digital video encoder system according to claim 6, wherein the digital video encoder system is implemented in a surveillance camera.

\* \* \* \* \*